(12) United States Patent
Kim et al.

(10) Patent No.: US 10,726,229 B2
(45) Date of Patent: Jul. 28, 2020

(54) FINGERPRINT DETECTION DEVICE AND DRIVING METHOD THEREFOR

(71) Applicant: Crucialtec Co., Ltd., Asan-si (KR)

(72) Inventors: Jung Hyun Kim, Osan-si (KR); Taek Moo Kim, Hwaseong-si (KR); Dong Woon Kim, Seoul (KR)

(73) Assignee: Crucialtec Co., Ltd., Asan-si ( * ) Notice: Subject to any disclaimer, the term of this patent is extended or adjusted under 35 U.S.C. 154(b) by 420 days.

(21) Appl. No.: 15/737,905

(22) PCT Filed: May 23, 2016

(86) PCT No.: PCT/KR2016/005429
§ 371 (c)(1),
(2) Date: Dec. 19, 2017

(87) PCT Pub. No.: WO2016/204416
PCT Pub. Date: Dec. 22, 2016

(65) Prior Publication Data
US 2018/0300521 A1 Oct. 18, 2018

(30) Foreign Application Priority Data

Jun. 19, 2015 (KR) .................. 10-2015-0087815
Nov. 9, 2015 (KR) .................. 10-2015-0156626

(51) Int. Cl.
*G06K 9/00* (2006.01)

(52) U.S. Cl.
CPC .................. *G06K 9/0002* (2013.01)

(58) Field of Classification Search
CPC ........... G06K 9/00107; G06K 9/00013; G06K 9/0004; G06K 9/0002
See application file for complete search history.

(56) References Cited

U.S. PATENT DOCUMENTS 6,681,033 B1 * 1/2004 Yano .................. G01D 5/24
382/108
6,927,581 B2 * 8/2005 Gozzini ................ G06K 9/0002
324/663

(Continued)

FOREIGN PATENT DOCUMENTS

KR 10-2006-0118087 11/2006
KR 10-2013-0056082 5/2013

(Continued)

OTHER PUBLICATIONS

International Search Report dated Sep. 12, 2016 in International Application No. PCT/KR2016/005429 (with English Translation).

*Primary Examiner* — Manav Seth
(74) *Attorney, Agent, or Firm* — H.C. Park & Associates, PLC

(57) ABSTRACT

A fingerprint detection device including a plurality of fingerprint sensing elements, and each fingerprint sensing element includes: a sensing electrode for forming a sensing capacitance from a relationship with a subject; an amplifier having a first input end connected to the sensing electrode and a second input end into which a bias signal, of which a potential is changed from a high level to a low level or from the low level to the high level during a fingerprint detection operation, is inputted; and a gain controller including a plurality of sub-feedback capacitances, the gain controller selectively connected between the first input end and an output end of the amplifier.

17 Claims, 8 Drawing Sheets

(56) References Cited

U.S. PATENT DOCUMENTS

| | | | | |
|---|---|---|---|---|
| 7,075,316 | B2* | 7/2006 | Umeda | G01R 27/2605 |
| | | | | 324/658 |
| 7,084,642 | B2* | 8/2006 | Gozzini | G06K 9/0002 |
| | | | | 324/663 |
| 7,864,992 | B2* | 1/2011 | Riedijk | G06K 9/0002 |
| | | | | 382/124 |
| 7,961,919 | B2* | 6/2011 | Chou | H03F 3/08 |
| | | | | 382/124 |
| 9,058,511 | B2* | 6/2015 | Chou | G06K 9/0002 |
| 9,152,841 | B1* | 10/2015 | Riedijk | G06K 9/036 |
| 9,600,705 | B2* | 3/2017 | Riedijk | G06F 3/044 |
| 2013/0129163 | A1 | 5/2013 | Chung et al. | |

FOREIGN PATENT DOCUMENTS

| | | |
|---|---|---|
| KR | 10-1432988 | 8/2014 |
| KR | 10-1502911 | 3/2015 |

\* cited by examiner

FINGERPRINT DETECTION DEVICE AND DRIVING METHOD THEREFOR

CROSS-REFERENCE TO RELATED APPLICATIONS

This application is a National Stage Entry of International Application No. PCT/KR2016/005429, filed on May 23, 2016, and claims priority from and the benefit of Korean Patent Application No. 10-2015-0087815, filed on Jun. 19, 2015, and Korean Patent Application No. 10-2015-0156626, filed on Nov. 9, 2015, which are hereby incorporated by reference for all purposes as if fully set forth herein.

BACKGROUND

Field

The present invention relates to a fingerprint detection device and an operating method of the same, and more particularly, to a fingerprint detection device in which a bias signal corresponding to a driving signal is supplied from the inside of each fingerprint sensing is element and an operating method of the same.

Discussion of the Background

Since people have different fingerprints, fingerprints are frequently used in the personal identification field. In particular, fingerprints are widely used as a means of personal authentication in various fields such as finance, criminal investigation, security, and the like.

Fingerprint recognition sensors have been developed to recognize such fingerprints and identify persons. A fingerprint recognition sensor is a device which comes into contact with a person's finger and recognizes the fingerprint, and is used as a means for determining whether the person is an authorized user.

Recently, the enhancement of personal authentication and security is drastically increasing in necessity in the mobile market, and security-related business based on mobile devices is vigorously underway.

Among methods for implementing a fingerprint recognition sensor, there are various recognition methods including an optical method, a thermal method, a capacitive method, and the like.

Among the methods, the principle of capacitive fingerprint sensing involves converting a difference between a capacitance formed between an uppermost metal plate and ridges of a fingerprint and a capacitance formed between the uppermost metal plate and valleys of the fingerprint into an electrical signal, comparing a magnitude of the electrical signal with a magnitude of a reference signal, and then digitizing and converting the electrical signal into an image to generate a fingerprint image.

FIG. 1 is a diagram showing an electronic device including a general capacitive fingerprint recognition device.

Referring to FIG. 1, a fingerprint recognition device provided at a part of an electronic device 1 includes a sensor array 10 composed of a plurality of fingerprint sensing elements and an external electrode 20 formed around the sensor array 10.

A driving signal is applied to the external electrode 20, and the driving signal is transferred to a finger through the external electrode 20. In response to the application of the driving signal, a response signal is received from the finger by the sensor array 10. A signal received by each fingerprint sensing element of the sensor array 10 varies according to whether a ridge or a valley of the finger comes into contact with the fingerprint sensing element. It is possible to acquire a fingerprint image by aggregating signals received by all the fingerprint sensing elements included in the sensor array 10.

However, the fingerprint recognition device employing this method necessarily requires the external electrode 20 for applying a driving signal. Therefore, the size and the manufacturing cost of the fingerprint recognition device increase, and the external electrode 20 limits the design of electronic device 1.

When a case of the electronic device 1 is metallic, a driving signal from the external electrode 20 is unintentionally used to charge a capacitance formed between a part of the finger and the case.

FIG. 2 is a circuit diagram showing a configuration of a fingerprint sensing element constituting the sensor array shown in FIG. 1.

Each fingerprint sensing element 11 constituting the sensor array 10 includes a sensing electrode P for forming a sensing capacitance Cf with a finger, an amplifier A having an inverted input terminal N1 connected to the sensing electrode P and a non-inverted input terminal to which a reference voltage Vref is input, a feedback capacitance Cfb formed between is the inverted input terminal N1 and an output terminal N2 of the amplifier A, a first switch S1 for connecting or disconnecting the first input terminal N1 of the amplifier A and the sensing electrode P, a second switch S2 for resetting a potential between both ends of the feedback capacitance Cfb, and a third switch S3 for controlling acquisition of an output voltage Vout of the amplifier A. During a fingerprint detection operation, a driving signal Tx having a magnitude of "VdrvH-VdrvL" is supplied from the external electrode.

FIG. 3 is a timing diagram illustrating operation of the fingerprint sensing element shown in FIG. 2.

In FIG. 3, with regard to each of the switches S1 to S3, a high level indicates an on-state, and a low level indicates an off-state.

First, during a first period T1, the second switch S2 is turned on, and the first switch S1 and the third switch S3 are turned off. Since the second switch S2 is in the on-state, the feedback capacitance of the amplifier A is reset.

Next, during a second period T2, the second switch S2 is switched to the off-state, and the first switch S1 is switched to the on-state. Accordingly, the sensing electrode P and the first input terminal N1 of the amplifier A are connected, and the feedback capacitance Cfb is formed for the amplifier A such that the output voltage Vout of the amplifier A is formed.

During a third period T3, the first and second switches S1 and S2 are switched to the off-state, and the third switch S3 is switched to the on-state such that the output voltage Vout of the amplifier A generated during the second period T2 is output. This can be represented as follows.

$$Vout = Vref - \frac{(VdrvH - VdrvL)Cf}{Cfb} \qquad \text{[Equation 1]}$$

Since an input voltage of the amplifier A is the reference voltage Vref, a gain of the amplifier A becomes $$\frac{(VdrvH - VdrvL)Cf}{Cfb}.$$

When the case of the electronic device is metallic, a metal capacitance Cm is formed between a finger and the case, and thus a part of the driving signal Tx supplied from the external electrode is used to charge the metal capacitance Cm.

Therefore, the result is the same as if the driving signal Tx was to be lowered by a predetermined potential Vd and then applied to the finger.

Here, when a fingerprint detection operation is performed, the output voltage Vout of the amplifier A can be represented as follows.

$$Vout = Vref - \frac{(VdrvH - VdrvL - Vd)Cf}{Cfb} \quad \text{[Equation 2]}$$

Since an input voltage of the amplifier A is the reference voltage Vref, a gain of the amplifier A becomes $$\frac{(VdrvH - VdrvL - Vd)Cf}{Cfb}.$$

The output voltage Vout of the amplifier A varies according to the capacitance Cf formed between the sensing electrode P and a finger, and a value thereof is used to acquire a fingerprint image. Since the metal capacitance Cm is formed due to the metallic electronic device, the driving voltage applied from the external electrode is reduced by the predetermined potential Vd such that the output voltage Vout of the fingerprint sensing element 11 has no alternative but to be lowered.

Consequently, it is necessary to develop a fingerprint detection device whose design is simplified while performance is not degraded by a material of an electronic device and which has no design limitations.

SUMMARY

The present invention is directed to solving the above-described problems of conventional art.

The present invention is also directed to providing a fingerprint detection device capable of fingerprint sensing without an external electrode for applying a driving signal.

The present invention is also directed to preventing an output signal from being degraded by distribution of an input signal even when an electronic device to which a fingerprint detection device is applied is made of a metallic material.

The present invention is also directed to maintaining a predetermined gain of an output signal at all times even when a parasitic capacitance component is present in a fingerprint detection device.

The present invention is also directed to making it possible to omit a charge pump for generating a driving signal by not using a method of applying a driving signal through an external electrode, and thereby allowing simplified design.

One aspect of the present invention provides a fingerprint detection device including a plurality of fingerprint sensing elements, each of the fingerprint sensing elements including: a sensing electrode configured to form a sensing capacitance with a subject; an amplifier configured to have a first input terminal connected to the sensing electrode and a second input terminal to which a bias signal whose potential is changed from a high level to a low level or from the low level to the high level during a fingerprint detection operation is input; and a gain controller configured to include a plurality of sub-feedback capacitances and to be is selectively connected between the first input terminal and an output terminal of the amplifier.

The fingerprint detection device may further include: a first switch configured to be connected between both ends of the gain controller; and a second switch configured to be connected to the output terminal of the amplifier and switched to an on-state during a period in which the first switch is maintained in an off-state.

The bias signal may have the high level and the low level, and may be switched from the high level to the low level or from the low level to the high level at a point in time at which or after the first switch is switched to the off-state.

The gain controller may include a plurality of third switches configured to selectively connect, to the output terminal of the amplifier, one ends of the plurality of sub-feedback capacitances whose other ends are connected to the first input terminal of the amplifier.

The fingerprint detection device may further include: a fourth switch configured to connect or disconnect a bias signal supply to the first input terminal of the amplifier; and a fifth switch configured to connect or disconnect a bias signal supply to the second input terminal of the amplifier and alternately operate with the fourth switch.

While the fifth switch of a fingerprint sensing element selected as a target of the fingerprint detection operation is maintained in an on-state, the fourth switch in at least one adjacent fingerprint sensing element may be maintained in the on-state.

The fingerprint detection device may further include a guard ring formed to surround a sensing electrode of the other fingerprint sensing element, and the bias signal may be supplied to the guard ring of the other fingerprint sensing element while the fourth switch is maintained in the on-state.

A ground potential may be applied to a sensing electrode of at least one is fingerprint sensing element which has not been selected as a target of the fingerprint detection operation, or the sensing electrode may be floated.

Another aspect of the present invention provides a fingerprint detection device including a plurality of fingerprint sensing elements, each of the fingerprint sensing elements including: an uppermost conductive layer in which a sensing electrode which forms a sensing capacitance with a subject is disposed; an amplifier configured to have a first input terminal connected to the sensing electrode and a second input terminal to which a bias signal whose potential is changed from a high level to a low level or from the low level to the high level during a fingerprint detection operation is input; and a gain controller configured to include a plurality of sub-feedback capacitances formed between a plurality of conductive layers disposed under the uppermost conductive layer and to be selectively connected between the first input terminal and an output terminal of the amplifier.

The gain controller may include: a first conductive layer in which a lowermost electrode connected to the output terminal of the amplifier is disposed; a plurality of switches configured to selectively connect the lowermost electrode and a plurality of sub-electrodes disposed in a second conductive layer on the first conductive layer; and a plurality of feedback capacitances connected between a feedback capacitance electrode disposed in a third conductive layer on the second conductive layer and the plurality of sub-electrodes.

At least one of the lowermost electrode and the plurality of sub-electrodes may be formed using a metal insulator metal (MIM) fabrication method.

The fingerprint detection device may further include a shield electrode configured to be disposed under the uppermost conductive layer and connected to a ground potential.

Another aspect of the present invention provides an operating method of a fingerprint detection device including a plurality of fingerprint sensing elements, the method including: selecting a specific fingerprint sensing element as a target of a fingerprint detection operation; determining a gain of a gain controller which changes a gain of an amplifier whose first input terminal is connected to a sensing electrode of the specific fingerprint sensing element; resetting the gain controller connected between the input terminal and an output terminal of the amplifier; when the reset is completed, switching a bias signal supplied to a second input terminal of the amplifier from a high level to a low level; and while the bias signal is maintained at the low level, connecting the amplifier to an external device so that an output signal of the amplifier is output.

The operating method may further include, after the selecting of the specific fingerprint sensing element, supplying the bias potential to a sensing electrode of at least one fingerprint sensing element other than the specific fingerprint sensing element.

The supplying of the bias potential may include supplying the bias signal to a guard ring formed to surround the sensing electrode of the at least one fingerprint sensing element.

The determining of the gain may include selectively connecting, to the output terminal of the amplifier, a plurality of feedback capacitances whose one ends are connected to the first input terminal of the amplifier.

The determining of the gain may include adjusting a difference value between the high level and the low level of the bias signal.

According to the present invention, since a bias signal corresponding to a driving signal is supplied from the inside of each fingerprint sensing element, an external electrode for applying a driving signal can be removed, and accordingly there is no limitations on design.

According to the present invention, since a method of applying a driving signal through an external electrode is not used, an output signal is not degraded by distribution of a signal even when an electronic device to which a fingerprint detection device is applied is made of a metallic material, and a predetermined gain of an output signal is maintained at all times even when there is a parasitic capacitance component is present.

According to the present invention, since a charge pump for supplying an external driving signal can be omitted, a chip area is reduced, and a simple design is possible.

DETAILED DESCRIPTION OF THE ILLUSTRATED EMBODIMENTS

Figure 1:
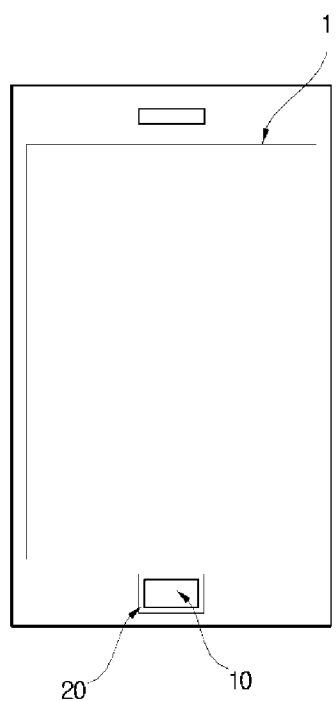
FIG. 1 is a diagram showing an electronic device including a general fingerprint recognition device.
Figure 2:
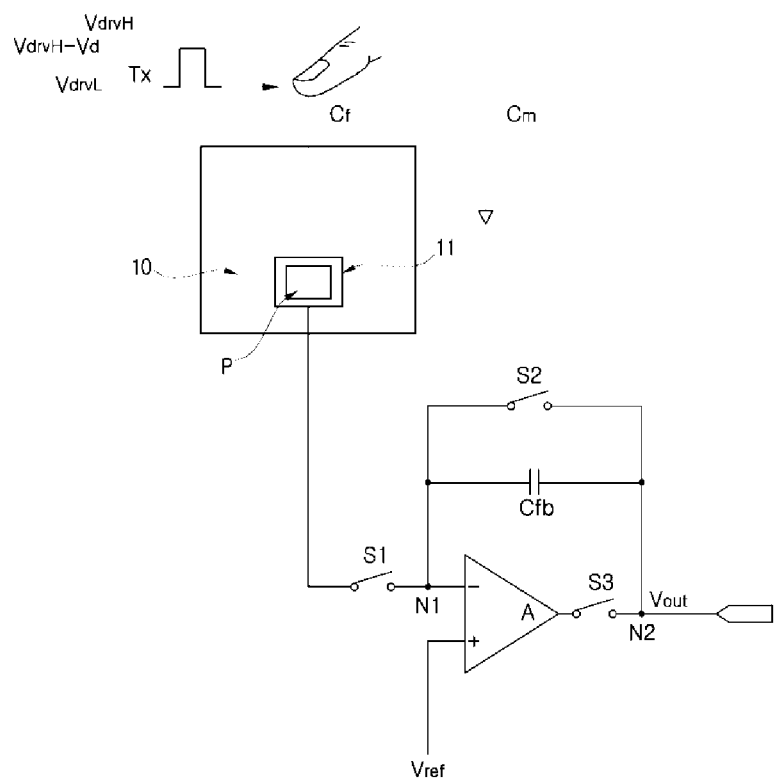
FIG. 2 is a circuit diagram showing a configuration of a fingerprint recognition device of FIG. 1.
Figure 3:
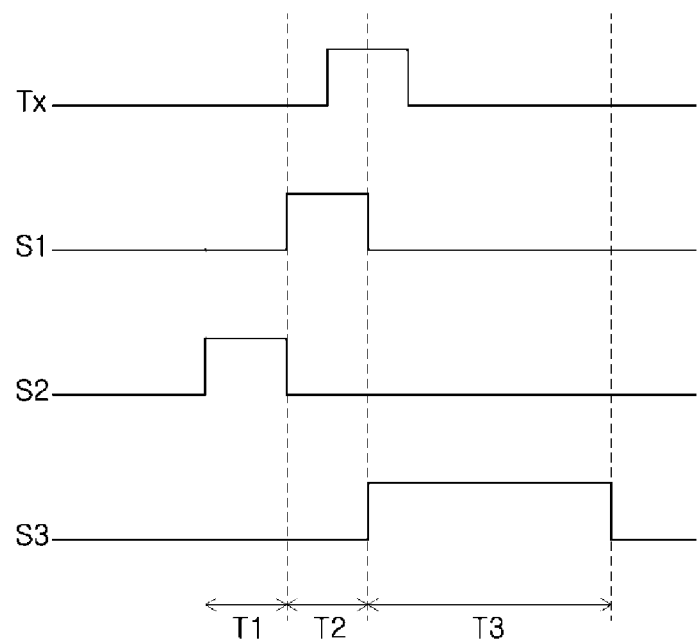
FIG. 3 is a timing diagram illustrating operation of the fingerprint recognition device of FIG. 2.

Hereinafter, the present invention will be described with reference to the accompanying drawings. However, the present invention may be implemented in various different forms and thus is not limited to the embodiments described herein. In the drawings, parts unrelated to the description have been omitted to clearly describe the present invention, and like reference numerals indicate like elements throughout the specification.

In the specification, when a part is "connected" to another part, the parts may not only be "directly connected" to each other but may also be "indirectly connected" via an intermediate member. Also, when a part "includes" a certain component, it means that, another part may be included therein and is not excluded unless particularly defined otherwise.

Embodiments of the present invention will be described in detail below with reference to the accompanying drawings.

Figure 4:
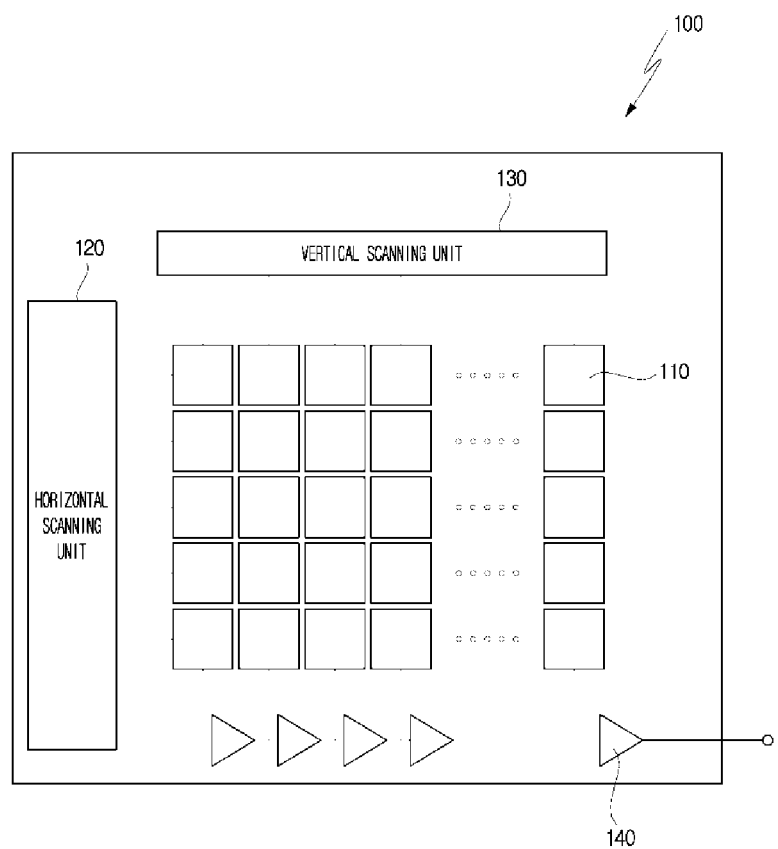
FIG. 4 is a diagram schematically showing a configuration of a fingerprint detection device according to an embodiment of the present invention.

FIG. 4 is a diagram schematically showing a configuration of a fingerprint detection device according to an embodiment of the present invention.

Referring to FIG. 4, a fingerprint detection device includes a sensor array 100 composed of a plurality of fingerprint sensing elements 110 which form a plurality of rows and columns. Each fingerprint sensing element 110 is enabled by a horizontal scanning unit 120 and a vertical scanning unit 130 and outputs a signal related to fingerprint detection. The signal is from the fingerprint sensing element 110 is output through a buffer 140. One buffer 140 is disposed for each column of fingerprint sensing elements 110. In other words, signals from fingerprint sensing elements 110 disposed in one column are output through one buffer 140.

As shown in FIG. 4, the fingerprint detection device according to an embodiment of the present invention does not include an external electrode for applying a driving signal, and a driving signal is applied from the inside of each fingerprint sensing element 110. This will be described in detail below.

Figure 5:
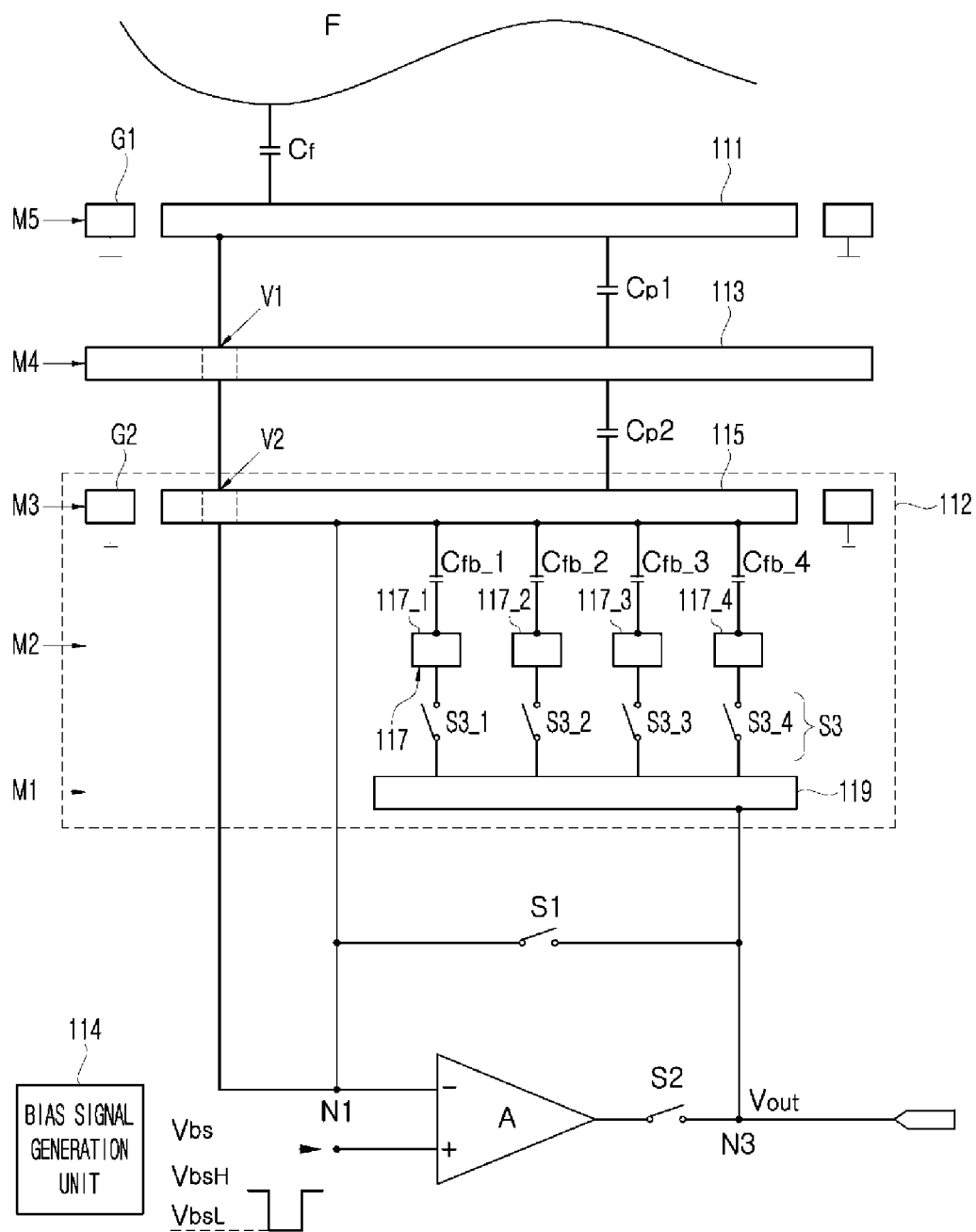
FIG. 5 is a cross-section view showing a configuration of a fingerprint sensing element according to an embodiment of the present invention.

FIG. 5 is a cross-section view showing a configuration of a fingerprint sensing element 110 of FIG. 4.

Referring to FIG. 5, the fingerprint sensing element 110 is formed to have a structure composed of a plurality of conductive layers M1 to M5 which are sequentially stacked at a lower portion of the fingerprint sensing element 110. Gaps between the conductive layers M1 to M5 may be filled with an insulating material, for example, SiO2, SiN, SiNOX, glass, and the like.

A sensing electrode 111, which forms a sensing capacitance Cf with a finger F which is a subject, is formed in the fifth conductive layer M5 which is the uppermost conductive layer. The sensing electrode 111 is connected to a first input terminal N1 of an amplifier A. An operation switch (not shown) may be formed between the sensing electrode 111 and the first input terminal N1 of the amplifier A. In a fingerprint sensing element 110 which is a current target of a fingerprint detection operation, the operation switch is switched to an on-state such that the sensing electrode 111 can be connected to the first input terminal N1 of the amplifier A. On the other hand, in a fingerprint sensing element 110 which is not a current target of a fingerprint detection operation, the operation switch is maintained in an off-state, and a ground potential may be applied to sensing electrodes 111 of the fingerprint sensing element 110, or the sensing electrodes may be floated.

A conducting wire for connecting the sensing electrode 111 and the first input terminal N1 of the amplifier A passes through the third conductive layer M3 and the fourth conductive layer M4. To this end, via holes V1 and V2 may be formed in the third conductive layer M3 and the fourth conductive layer M4.

A shield electrode which surrounds the sensing electrode 111, that is, a guard ring G1, is formed in the fifth conductive layer M5 and minimizes a parasitic capacitance formed between the ground potential or another potential and an adjacent fingerprint sensing element 110.

Additionally, a protection layer (not shown) for protecting the sensing electrode 111 may be formed on the fifth conductive layer M5. The protection layer protects the sensing electrode 111 from electrostatic discharge (ESD) and external abrasion.

A shield electrode 113 is formed in the fourth conductive layer M4 under the fifth conductive layer M5. The shield electrode 113 is connected to the ground potential. During a fingerprint detection operation, a first feedback capacitance electrode 115 formed in the third metal layer M3 and the sensing electrode 111 formed in the fifth metal layer M5 vary in potential, and thus parasitic capacitances $Cp1$ and $Cp2$ are formed between the sensing electrode 111 and the shield electrode 113 and between the shield electrode 113 and the first feedback capacitance electrode 115.

First, the first parasitic capacitance $Cp1$ formed between the sensing electrode 111 and the shield electrode 113 is greatly affected by whether the finger F approaches the sensing electrode 111 or by external noise which is not the finger F. Since the shield electrode 113 is connected to the ground potential, charge stored in the first parasitic capacitance $Cp1$ is discharged to the ground potential. In other words, during a fingerprint detection operation, the influence of the first parasitic capacitance $Cp1$ may be minimized by the shield electrode 113.

The second parasitic capacitance $Cp2$ is as follows. The shield electrode 113 is connected to the ground potential, and the first feedback capacitance electrode 115 is connected to the first input terminal N1 of the amplifier A such that the second parasitic capacitance $Cp2$ has the same potential as the second input terminal N2 of the amplifier A. Since a bias signal Vbs output from a bias signal generation unit 114 is applied to the second input terminal N2 of the amplifier A, a potential difference (a voltage) between the first feedback capacitance electrode 115 and the shield electrode 113 becomes the same as a potential of the bias signal Vbs. Also, since it is possible to know formulated values of individual areas of the shield electrode 113 and the first feedback capacitance electrode 115, a distance between the two electrodes, a permittivity of an insulating layer (not shown) between the two electrodes, and the like, the second parasitic capacitance $Cp2$ is a value which can be calculated. The parasitic capacitance $Cp2$ which can be calculated in this way may be easily removed through a parasitic capacitance removal circuit, or may be used as a value to be taken into consideration in the calculation during a fingerprint detection operation. Also, the value may be taken into consideration in the calculation to adjust a capacitance value of a gain controller 112 which will be described below.

To sum up, noise caused by the first parasitic capacitance $Cp1$ is naturally removed by the shield electrode 113, and noise caused by the second parasitic capacitance $Cp2$ is a value which can be calculated and thus can be easily removed or taken into consideration. In other words, it is possible to minimize influence of noise using the shield electrode 113 such that the accuracy of fingerprint detection may be improved.

As described above, since the fingerprint detection device according to an embodiment of the present invention can remove, using the fourth conductive layer M4 connected to the ground potential, static electricity or noise caused by an external factor such as a human body, it is possible to detect a fingerprint with higher accuracy without a bezel.

The first to third conductive layers M1 to M3 sequentially stacked at the lower portion function as the gain controller 112 which determines a feedback capacitance of the amplifier A.

Specifically, the first feedback capacitance electrode 115 and a second feedback capacitance electrode 117 are disposed in the third conductive layer M3 and the second conductive layer M2 disposed under the third conductive layer M3. The first feedback capacitance electrode 115 is connected to the first input terminal N1 of the amplifier A, and the second feedback capacitance electrode 117 is connected to an output terminal N3 of the amplifier A. A plurality of sub-feedback capacitances $Cf\_1$, $Cf\_2$, $Cf\_3$, and $Cf\_4$ are formed between the first feedback capacitance electrode 115 and the second feedback capacitance electrode 117. The second feedback capacitance electrode 117 is composed of sub-electrodes 117_1, 117_2, 117_3, and 117_4, and one ends of the sub-feedback capacitances $Cf\_1$, $Cf\_2$, $Cf\_3$, and $Cf\_4$ are connected to the sub-electrodes 117_1, 117_2, 117_3, and 117_4, respectively. The sub-feedback capacitances $Cf\_1$, $Cf\_2$, $Cf\_3$, and $Cf\_4$ may have the same value or different values. For example, when the first sub-feedback capacitance $Cf\_1$ has a value of X, the second to fourth sub-feedback capacitances $Cf\_2$, $Cf\_3$, and $Cf\_4$ may be X2, X3, and X4, respectively, but the capacitance values are not limited thereto.

The sub-electrodes 117_1, 117_2, 117_3, and 117_4 constituting the second is feedback capacitance electrode 117 are formed according to the number of sub-feedback capacitances $Cf\_1$, $Cf\_2$, $Cf\_3$, and $Cf\_4$. Although the drawing shows a case in which the four sub-feedback capacitances $Cf\_1$, $Cf\_2$, $Cf\_3$, and $Cf\_4$ are formed by way of example, the number of sub-feedback capacitances $Cf\_1$, $Cf\_2$, $Cf\_3$, and $Cf\_4$ may vary, and accordingly the number of sub-electrodes 117_1, 117_2, 117_3, and 117_4 constituting the second feedback capacitance electrode 117 varies. Each of the sub-electrodes 117_1, 117_2, 117_3, and 117_4 is selectively connected to the output terminal N3 of the amplifier A. In other words, the sub-electrodes 117_1, 117_2, 117_3, and 117_4 and the output terminal N3 of the amplifier A may be selectively connected by a plurality of third switches $S3\_1$, $S3\_2$, $S3\_3$, and $S3\_4$. Accordingly, only some of the sub-feedback capacitances $Cf\_1$, $Cf\_2$, $Cf\_3$, and $Cf\_4$ are selected, and a total capacitance of the selected sub-feedback capacitances $Cf\_1$, $Cf\_2$, $Cf\_3$, and $Cf\_4$ functions as a feedback capacitance of the amplifier A. For example, assuming that the first sub-feedback capacitance $Cf\_1$ and the second sub-feedback capacitance Cf_2 are selected, a parallel total capacitance of the two sub-feedback capacitances functions as a feedback capacitance of the amplifier A.

An output voltage Vout of the amplifier A is inversely proportional to a value of the feedback capacitance determined by the gain controller 112. When the value of the feedback capacitance is varied by the third switches S3_1, S3_2, S3_3, and S3_4, an output voltage range of the amplifier A may vary.

For example, when it is necessary to increase fingerprint detection sensitivity (necessary to expand the output voltage range of the amplifier), the third switches S3_1, S3_2, S3_3, and S3_4 are used to disconnect some of the sub-feedback capacitances Cf_1, Cf_2, Cf_3, and Cf_4 and reduce the value of the feedback capacitance. On the other hand, when it is necessary to decrease the fingerprint detection sensitivity (necessary to narrow the output voltage range of the amplifier), the third switches S3_1, S3_2, S3_3, and S3_4 are used to additionally connect some of the sub-feedback capacitances Cf_1, Cf_2, Cf_3, and Cf_4 and increase the value of the feedback capacitance. In other words, since the feedback capacitance of the amplifier A is varied by the gain controller 112, it is possible to optimize fingerprint detection sensitivity. For example, it is possible to optimize fingerprint detection sensitivity by appropriately adjusting the value of the feedback capacitance according to factors such as a power supply voltage of an electronic device in which the fingerprint detection device is installed, a thickness of a coating layer, various kinds of noise, and the like.

A first switch S1 may be connected between the first input terminal N1 and the output terminal N3 of the amplifier A. As a switch for resetting the feedback capacitance of the amplifier A, the first switch S1 is turned on in a preparation step for fingerprint detection and is turned off during a fingerprint detection process.

The third conductive layer M3 includes a guard ring G2 which surrounds the first feedback capacitance electrode 115, and the guard ring G2 is connected to the ground potential or another potential and prevents interference by an adjacent sensing pixel.

Although not shown in the drawing, a guard ring for the same use may be additionally formed between the sub-electrodes 117_1, 117_2, 117_3, and 117_4 of the second feedback capacitance electrode 117 and in a region adjacent to the whole second feedback capacitance electrode 117.

The second feedback capacitance electrode 117 formed in the second conductive layer M2 may be fabricated using a metal insulator metal (MIM) fabrication method. When the second feedback capacitance electrode 117 is fabricated using the MIM fabrication method, the is second feedback capacitance electrode 117 has its own capacitance, and thus at least some of the sub-feedback capacitances Cf_1, Cf_2, Cf_3, and Cf_4 may be omitted.

The first conductive layer M1, which is the lowermost conductive layer, is formed under the second conductive layer M2 in which the second feedback capacitance electrode 117 is disposed. Disposed in the first conductive layer M1 is a lowermost electrode 119 which is selectively connected to at least one of the sub-electrodes 117_1, 117_2, 117_3, and 117_4 of the second feedback capacitance electrode 117 by the third switches S3_1, S3_2, S3_3, and S3_4. Also, an electrode for routing an operating power of the amplifier A or other signals, an electrode connected to the ground potential, and the like may be additionally disposed in the first conductive layer M1. Like the second feedback capacitance electrode 117, the lowermost electrode 119 may also be fabricated using the MIM fabrication method.

The bias signal Vbs is input to the second input terminal N2 of the amplifier A. The bias signal Vbs is a signal generated by the bias signal generation unit 114, and a level thereof can be adjusted by the bias signal generation unit 114. According to an embodiment, the bias signal Vbs may be a square wave having variable potential. Specifically, the bias signal Vbs may be a signal having two potential levels, that is, a high level VbsH and a low level VbsL.

In the fingerprint sensing element 110 which is a target of a fingerprint detection operation in which the sensing electrode 111 and the first input terminal N1 of the amplifier A are connected, a parasitic capacitance Cp3 may be formed by a circuit feature, a relationship with an adjacent fingerprint sensing element 110, or the like. The parasitic capacitance Cp3 may be connected to and equalized with the first input terminal N1 of the amplifier A. The parasitic capacitance Cp3 of the fingerprint sensing element 110 which is a target of a fingerprint detection operation may have a value of about tens of fF to about one hundred fF.

Figure 6:
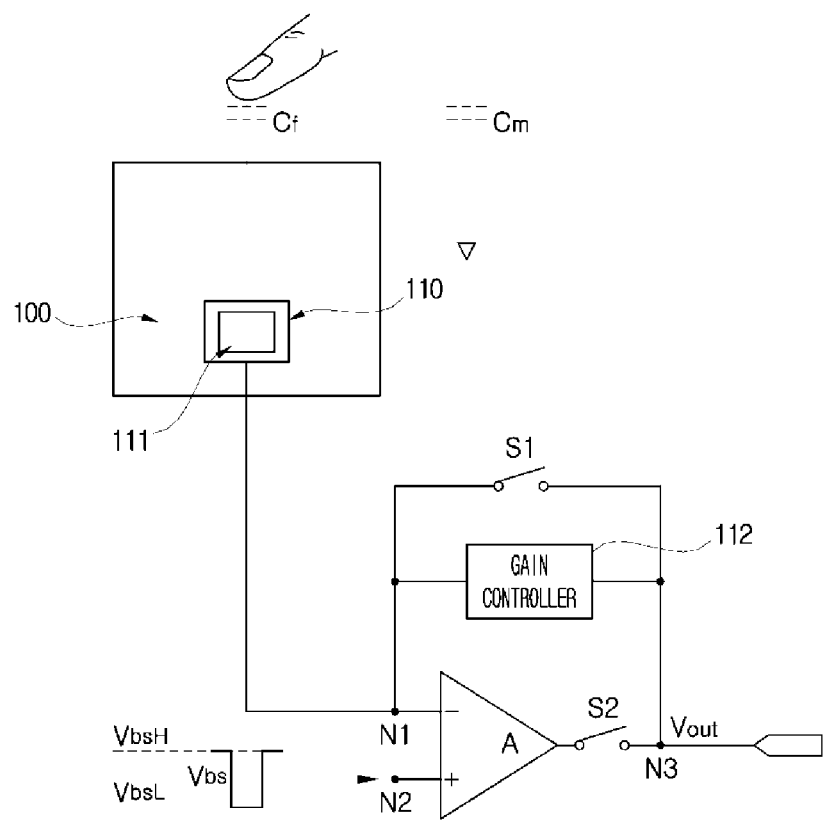
FIG. 6 is a circuit diagram showing a configuration of a fingerprint sensing element according to an embodiment of the present invention.
Figure 7:
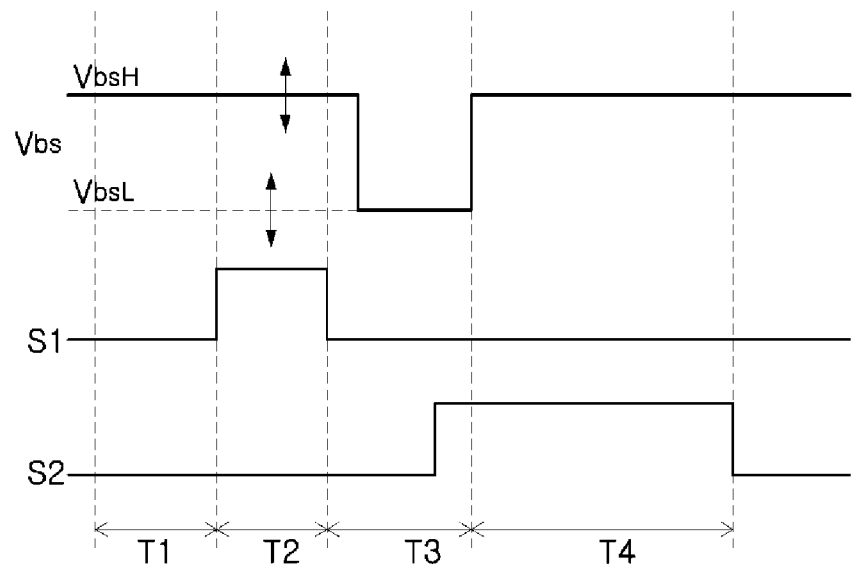
FIG. 7 is a timing diagram illustrating a method of detecting a fingerprint according to an embodiment of the present invention.
Figure 8:
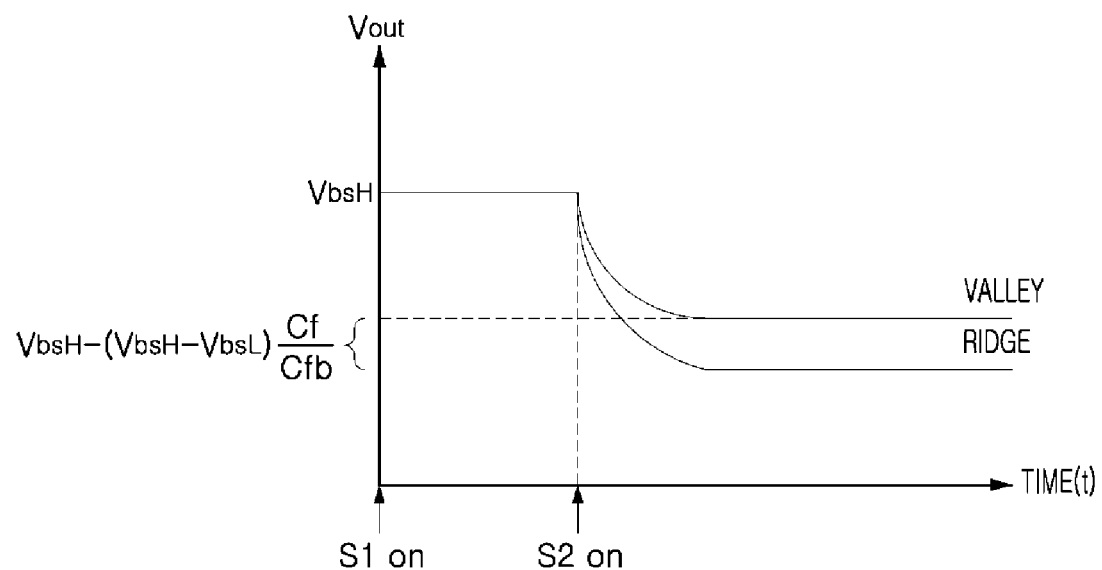
FIG. 8 is a graph showing a change in output voltage of a fingerprint sensing element according to an embodiment of the present invention.

FIG. 6 is an equivalent circuit diagram of the fingerprint sensing element of FIG. 5, and FIG. 7 is a timing diagram illustrating a fingerprint detection operation of a fingerprint sensing element according to an embodiment of the present invention. Also, FIG. 8 is a graph showing a change in output voltage value of a fingerprint sensing element.

In FIG. 6, a metal capacitance Cm denotes a capacitance formed between a finger and an electronic device made of a metallic material in which a fingerprint detection device is installed. The gain controller 112 formed between the first input terminal N1 and the output terminal N3 of the amplifier A is a variable capacitance and functions as a feedback capacitance of the amplifier A. Specifically, a capacitance of the gain controller 112 becomes a total capacitance of one or more of the sub-feedback capacitances Cf_1, Cf_2, Cf_3, and Cf_4 selected by the third switches S3_1, S3_2, S3_3, and S3_4 described with reference to FIG. 5. From now, the feedback capacitance of the amplifier A formed by the gain controller 112 is indicated as "Cfb."

As a signal supplied by the bias signal generation unit 114, the bias signal Vbs is maintained at the high level VbsH and lowered to the low level VbsL at predetermined intervals, that is, every sensing time point, or maintained at the low level VbsL and raised to the high level VbsH at predetermined intervals, that is, every sensing time point. The bias signal Vbs may be controlled by a clock signal, or may be diversely implemented as an alternating current (AC) voltage, a direct current (DC) voltage, or the like. An example in which the bias signal Vbs is maintained at the high level VbsH and lowered to the low level VbsL at predetermined intervals, that is, every sensing time point, will be described below. However, the following description is the same vice-versa.

A fingerprint detection operation of a fingerprint sensing element 110 according is to an embodiment will be described below with reference to FIGS. 6 to 8.

In FIG. 7, a high level of the first and second switches S1 and S2 denotes an on-state, and a low level thereof denotes an off-state.

First, during a first period T1, which is a sleep period, both the first and second switches S1 and S2 are maintained in the off-state.

At this time, a sensing capacitance Cf formed between the sensing electrode 111 and a finger and the parasitic capacitance Cp3 are charged by the bias signal Vbs maintained at the high level VbsH, and a charged charge quantity is as follows.

$$Q_1 = VbsH \cdot (Cf + Cp3) \quad \text{[Equation 3]}$$

During a second period T2, which is a reset period, the first switch S1 is switched from the off-state to the on-state. Accordingly, both ends of the gain controller 112 have the same potential, and thus the gain controller 112 is reset. Also, during the second period T2, the output voltage Vout of the amplifier A becomes the same as a potential of the first input terminal N1 and the second input terminal N2 of the amplifier A. In other words, as shown in FIG. 8, the output voltage Vout is maintained at the potential of the bias signal Vbs input to the second input terminal N2 of the amplifier A, that is, a value of the high level VbsH.

A third period T3, which is an operation period, begins at the same time as or immediately after the first switch S1 is switched to the off-state. During the third period T3, the bias signal Vbs is lowered to the low level VbsL. When the bias signal Vbs is lowered to the low level VbsL, a charge quantity Q2 which may be stored in the sensing capacitance Cf and the parasitic capacitance Cp3 is as follows.

$$Q_2 VbsL \cdot (Cf + Cp3) \quad \text{[Equation 4]}$$

Referring to Equations 3 and 4, Q1>Q2 since VbsH>VbsL. In other words, when the bias signal Vbs is lowered to the low level VbsL during the third period T3, the charge quantity Q1 charged in the sensing capacitance Cf during the second period T2 is partially discharged. A discharged charge quantity (Q1-Q2) migrates to the feedback capacitance Cfb of the amplifier A, and a migrating charge quantity Q3 may be represented as follows.

$$Q_3 = Q_1 - Q_2 = (VbsH - VbsL)(Cf + Cp3) \quad \text{[Equation 5]}$$

To acquire the output voltage Vout of the amplifier A during the operation period, the second switch S2 is switched to the on-state immediately after the bias signal Vbs is switched to the low level VbsL or at a specific time point while the bias signal Vbs is maintained at the low level VbsL. Since the second switch S2 is switched to the on-state, the output voltage Vout of the amplifier A may be transmitted to an external device which stores, handles, or processes a received signal.

During a fourth period T4 which is an output period, the bias signal Vbs is continuously maintained at the low level VbsL, and accordingly a potential of the first input terminal N1 of the amplifier A is also maintained at the low level VbsL of the bias signal Vbs. During this period, the second switch S2 for acquiring the output voltage Vout of the amplifier A is maintained in the on-state. At this time, a charge quantity Q4 stored in the feedback capacitance Cfb of the amplifier A is continuously maintained at the charge quantity Q3 which migrates during the third period T3, and thus the following equation holds.

$$Q_4 = (VbsL - Vout)Cfb = Q_3 = (VbsH - VbsL)(Cf + Cf3) \quad \text{[Equation 6]}$$

Here, the output voltage Vout of the amplifier A is determined as follows.

$$Vout = VbsL - \frac{(VbsH - VbsL)Cp3}{Cfb} - \frac{(VbsH - VbsL)Cf}{Cfb} \quad \text{[Equation 7]}$$

Since an input voltage of the amplifier A is a potential of the low level VbsL of the bias signal Vbs, a gain of the amplifier A is $$\frac{(VbsH - VbsL)Cf}{Cfb}.$$

Referring to FIG. 7, it is possible to see that the gain of the amplifier A is the same at all times regardless of a value of the parasitic capacitance Cp3. In other words, the gain is the same at all times even with the presence of the parasitic capacitance Cp3 which may be connected to and equalized with the first input terminal N1 of the amplifier A.

Referring to FIG. 8, it is possible to see that the output voltage Vout of the amplifier A becomes the value represented by Equation 7 when the second switch S2 connected to the output terminal N3 of the amplifier A is switched to the on-state and then becomes a normal state.

Also, referring to FIG. 8, it is possible to see that the output voltage Vout of the amplifier A varies according to whether a ridge or a valley of a finger comes into contact with the sensing electrode 111 when the second switch S2 is switched to the on-state and then becomes a normal state.

When the sensing electrode 111 comes into contact with a valley of a finger, a distance between the sensing electrode 111 and the skin of the finger is relatively longer than that of a case in which the sensing electrode 111 comes into contact with a ridge of the finger, and accordingly the sensing capacitance Cf is reduced. Therefore, in Equation 7, the output voltage Vout of the amplifier A becomes greater than that of the case in which the sensing electrode 111 is comes into contact with a ridge of the finger. Based on this principle, it is possible to know which part of a fingerprint has come into contact with each sensing electrode 111 through the output voltage Vout of the amplifier A, and a fingerprint image can be acquired by aggregating the output voltages Vout of all fingerprint sensing elements 110.

Referring to Equation 7, the output voltage Vout of the amplifier A is proportional to a value of difference between the high level VbsH and the low level VbsL of the bias signal Vbs. Therefore, it is possible to control the gain of the amplifier A by appropriately adjusting the high level VbsH and the low level VbsL of the bias signal Vbs. In other words, the gain of the amplifier A may be controlled through the third switches S3_1, S3_2, S3_3, and S3_4 included in the gain controller 112 and may also be controlled by adjusting the bias signal Vbs. Like this, it is possible to control the gain applied to the output voltage Vout of the fingerprint sensing element 110 in various ways, and thus a fingerprint detection device according to the present invention can be applied not only to portable devices but also to various other devices.

Also, when an electronic device to which the fingerprint detection device is applied is made of a metallic material and a driving signal required for a fingerprint detection operation is supplied through an external electrode which is provided separately from the fingerprint sensing element 110, a portion of the driving signal is used to charge a metal capacitance Cm formed due to the metallic material. As a result, this is the same as if a maximum potential of the driving signal was to be partially lowered, and accordingly the output voltage Vout of the fingerprint sensing element 110 may also be lowered. However, according to an embodiment of the present invention, since the bias signal Vbs corresponding to the driving signal is supplied through the amplifier A provided in the fingerprint sensing element 110, even when the electronic device is made of a metallic material, the bias signal Vbs is not distributed to a parasitic capacitance formed due to an external environment or to the metal capacitance Cm. Therefore, it is possible to prevent the output voltage Vout of the fingerprint sensing element 110 from being lowered under any circumstances. Also, since an external electrode for supplying a driving signal is unnecessary, design of the electronic device is facilitated. In addition, since a charge pump circuit and the like required to supply a driving signal through an external electrode is unnecessary, it is possible to reduce an overall chip area, and a cost of parts is reduced.

The bias signal Vbs is switched again to the high level VbsH during or before a subsequent sensing period in which the first period T1 of FIG. 7 reoccurs.

Figure 9:
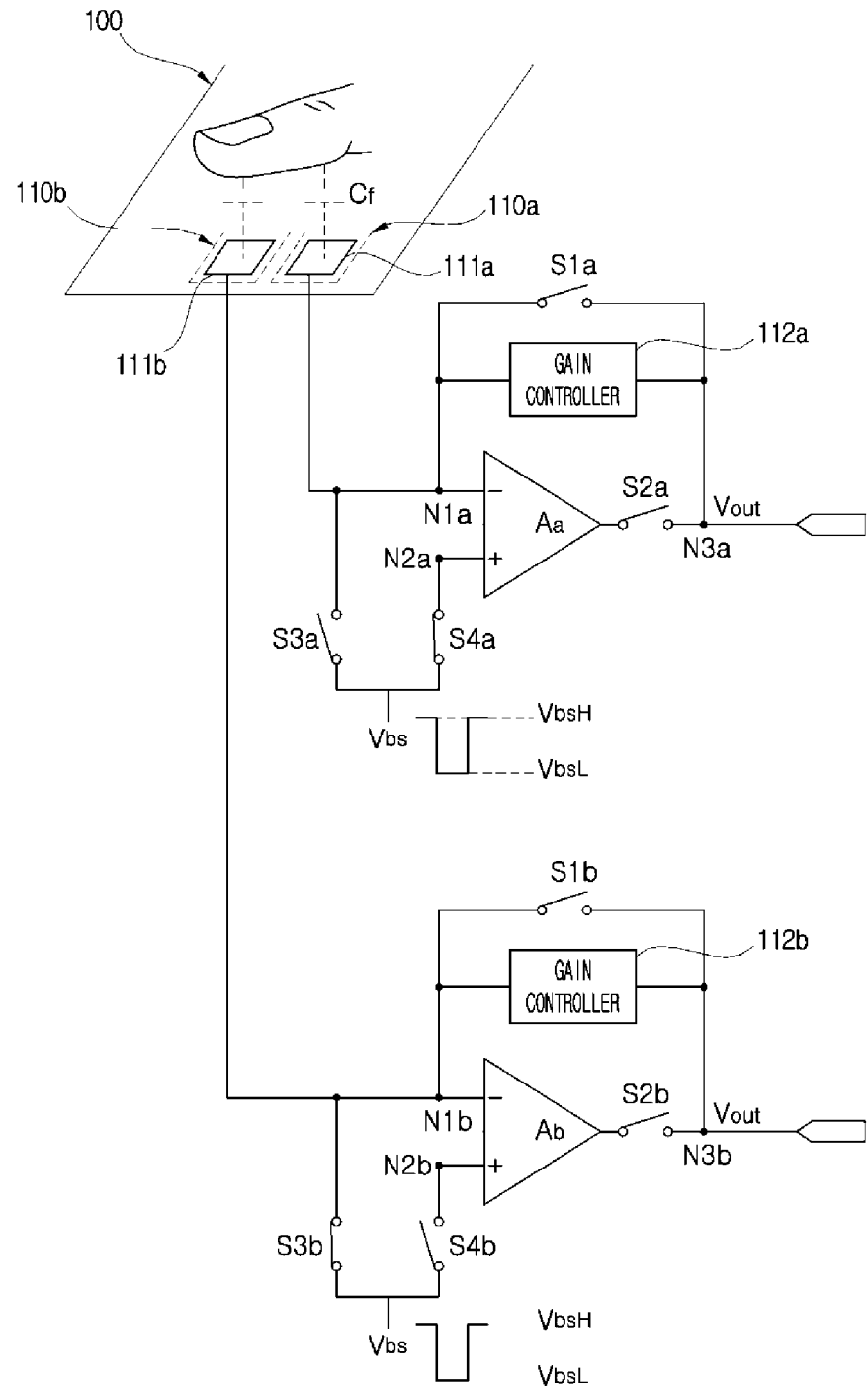
FIG. 9 is a circuit diagram showing a configuration of a fingerprint sensing element according to another embodiment of the present invention.

FIG. 9 is a diagram showing a fingerprint sensor array of a fingerprint sensing element according to another embodiment of the present invention.

Referring to FIG. 9, in the fingerprint detection device according to the other embodiment of the present invention, fourth switches S4a and S4b and fifth switches S5a and S5b are connected to first input terminals N1a and N1b and second input terminals N2a and N2b of amplifiers Aa and Ab of fingerprint sensing elements 110a and 110b, respectively.

Specifically, one ends of the fourth switches S4a and S4b are connected to the first input terminals N1a and N1b of the amplifiers Aa and Ab, and the bias signal Vbs is supplied to the other ends. In other words, the fourth switches S4a and S4b function to connect or disconnect a supply of the bias signal Vbs to the first input terminals N1a and N1b.

One ends of the fifth switches S5a and S5b are connected to the second input terminals N2a and N2b of the amplifiers Aa and Ab, and the bias signal Vbs is supplied to the other ends. In other words, the fifth switches S5a and S5b function to connect or disconnect a supply of the bias signal Vbs to the second input terminals N2a and N2b.

The fourth switches S4a and S4b and the fifth switches S5a and S5b are alternately turned on or off.

When a current fingerprint detection operation is attempted on the first fingerprint sensing element 110a, the bias signal Vbs should be supplied to the second input terminal N2a of the amplifier Aa included in the first fingerprint sensing element 110a, and thus the fifth switch S5a of the first fingerprint sensing element 110a is switched to the on-state.

On the other hand, in the at least one second fingerprint sensing element 110b which is not a current target of the fingerprint detection operation and is adjacent to the first fingerprint sensing element 110a, the bias signal Vbs is not required to be supplied to the second input terminal N2b of the amplifier Ab, and thus the fifth switch S5b is maintained in the off-state. While the fifth switch S5b is maintained in the off-state, the fourth switch S4b is switched to the on-state, and the bias signal Vbs is supplied to the first input terminal N1b of the amplifier Ab. Accordingly, a sensing electrode 111b of the second fingerprint sensing element 110b connected to the first input terminal N1b of the amplifier Ab has the same potential as the bias signal Vbs while the fourth switch S4b is maintained in the on-state.

Since the bias signal Vbs is also supplied to second input terminal N2a of the amplifier Aa in the first fingerprint sensing element 110a, a sensing electrode 111a connected to the first input terminal N1a of the amplifier Aa has the same potential as the bias signal Vbs.

The bias signals Vbs supplied to the first fingerprint sensing element 110a and the second fingerprint sensing element 110b are synchronized, and as a result, the sensing electrode 111a of the first fingerprint sensing element 110a and the sensing electrode 111b of the second fingerprint sensing element 110b are maintained at the same potential.

In other words, when the fingerprint detection operation is performed on the first fingerprint sensing element 110a, the sensing electrode 111a of the first fingerprint sensing element 110a is maintained at the same potential as the adjacent sensing electrode 111b.

FIG. 9 shows a case in which the sensing electrode 111a of the first fingerprint sensing element 110a and the sensing electrode 111b of the second fingerprint sensing element 110b are adjacent. However, according to an embodiment of the present invention, since the bias signals Vbs supplied to the first fingerprint sensing element 110a and the second fingerprint sensing element 110b are synchronized, the sensing electrodes 111a and 111b maintain the same potential and make accurate sensing possible even when disposed apart from each other.

When two conductors are disposed adjacent to each other with a material having a predetermined permittivity interposed therebetween and a potential difference between the two conductors is converged to nearly 0, a charge quantity induced by the potential difference between the two conductors is also converged to nearly 0. Accordingly, a parasitic capacitance formed between the two conductors is removed.

Therefore, according to the embodiment shown in FIG. 9, when the sensing electrode 111a of the first fingerprint sensing element 110a and the adjacent sensing electrode 111b are maintained at the same potential during the fingerprint detection operation of the first fingerprint sensing element 110a, a parasitic capacitance formed between the adjacent sensing electrodes 111a and 111b is removed.

In an operating method of the fingerprint detection device according to an embodiment of the present invention, since the sensing electrodes 111a and 111b are maintained at the same potential to remove the parasitic capacitance between the sensing electrodes 111a and 111b, it is possible to remove noise without the guard ring G1 (see FIG. 5) which surrounds each of the sensing electrodes 111a and 111b.

According to another embodiment, the guard rings G1 (see FIG. 5) may be formed to surround the sensing electrodes 111a and 111b of the fingerprint sensing elements 110a and 110b near the sensing electrodes 111a and 111b as described above. In this case, the bias signal Vbs may be supplied to the guard ring G1 surrounding the sensing electrode 111b of the second fingerprint sensing element 110b which has not been selected as a target of a fingerprint detection operation. The guard ring G1 formed around the sensing electrode 111a of the first fingerprint sensing element 110a, which is the target of a fingerprint detection operation, is connected to the ground potential and may serve to block external noise.

According to an embodiment, there may be a plurality of first fingerprint sensing elements 110a which are targets of a fingerprint detection operation. In other words, the fingerprint detection operation may be simultaneously performed in a plurality of first fingerprint sensing elements 110a. In this case, the fifth switch S5a of each of the simultaneously selected plurality of first fingerprint sensing elements 110a is maintained in the on-state, and all the while the fourth switches S4b may be maintained in the on-state in the second fingerprint sensing elements 110b which have not been selected as targets of the fingerprint detection operation. When the plurality of first fingerprint sensing elements 110a selected as targets of the fingerprint detection operation are disposed adjacent to each other, mutual interference may occur due to flows of signals generated during the fingerprint detection operation and the like, or parasitic capacitances may be formed between the fingerprint sensing elements 110a such that accuracy of fingerprint detection may be degraded. To prevent this, it is preferable to select first fingerprint sensing elements 110a which are apart from each other when simultaneously selecting a plurality of first fingerprint sensing elements 110a as targets of the fingerprint detection operation.

The above description of the present invention is provided for illustrative purposes, and those of ordinary skill in the technical field to which the present invention pertains should understand that the present invention can be easily modified into other specific forms without changing the technical spirit or essential features of the present invention. Therefore, it should be understood that the above-described embodiments are illustrative only in all aspects and are not restrictive. For example, each component which is described as a single part can be implemented in a distributed manner. Likewise, components which are described as distributed parts can be implemented in a combined manner.

The scope of the present invention is presented by the following claims. It should be understood that all changes or modifications derived from the definitions and scope of the claims and their equivalents fall within the scope of the present invention.

The invention claimed is:

1. A fingerprint detection device comprising a plurality of fingerprint sensing elements, each of the fingerprint sensing elements comprising:
   a sensing electrode forming a sensing capacitance with a subject;
   an amplifier comprising a first input terminal connected to the sensing electrode and a second input terminal configured to receive a bias signal whose potential is changed from a high level to a low level or from the low level to the high level during a fingerprint detection operation; and
   a gain controller comprising a plurality of sub-feedback capacitances configured to be selectively connected between the first input terminal and an output terminal of the amplifier.

2. The fingerprint detection device of claim 1, further comprising:
   a first switch connected between both ends of the gain controller; and
   a second switch connected to the output terminal of the amplifier and configured to be switched to an on-state during a period in which the first switch is maintained in an off-state.

3. The fingerprint detection device of claim 2, wherein the bias signal is switched from the high level to the low level or from the low level to the high level at a time point at which or after the first switch is switched to the off-state.

4. The fingerprint detection device of claim 1, wherein the gain controller comprises a plurality of third switches configured to selectively connect, to the output terminal of the amplifier, one ends of the plurality of sub-feedback capacitances whose other ends are connected to the first input terminal of the amplifier.

5. The fingerprint detection device of claim 1, further comprising:
   a fourth switch configured to connect or disconnect a bias signal supply to the first input terminal of the amplifier; and
   a fifth switch configured to connect or disconnect a bias signal supply to the second input terminal of the amplifier and alternately operate with the fourth switch.

6. The fingerprint detection device of claim 5, wherein, while the fifth switch of a fingerprint sensing element selected as a target of the fingerprint detection operation is maintained in an on-state, the fourth switch in at least one adjacent fingerprint sensing element is maintained in the on-state.

7. The fingerprint detection device of claim 6, further comprising a guard ring surrounding a sensing electrode of the other fingerprint sensing element,
   wherein the bias signal is supplied to the guard ring of the other fingerprint sensing element while the fourth switch is maintained in the on-state.

8. The fingerprint detection device of claim 1, wherein a ground potential is applied to a sensing electrode of at least one fingerprint sensing element which has not been selected as a target of the fingerprint detection operation, or otherwise the sensing electrode is floated.

9. A fingerprint detection device comprising a plurality of fingerprint sensing elements, each of the fingerprint sensing elements comprising:
   an uppermost conductive layer in which a sensing electrode, which forms a sensing capacitance with a subject, is disposed;
   an amplifier comprising a first input terminal connected to the sensing electrode and a second input terminal configured to receive a bias signal whose potential is changed from a high level to a low level or from the low level to the high level during a fingerprint detection operation; and
   a gain controller comprising a plurality of sub-feedback capacitances formed between a plurality of conductive layers disposed under the uppermost conductive layer and configured to be selectively connected between the first input terminal and an output terminal of the amplifier.

10. The fingerprint detection device of claim 9, wherein the gain controller comprises:
    a first conductive layer in which a lowermost electrode connected to the output terminal of the amplifier is disposed;
    a plurality of switches configured to selectively connect the lowermost electrode and a plurality of sub-electrodes disposed in a second conductive layer on the first conductive layer; and
    a plurality of feedback capacitances connected between a feedback capacitance electrode disposed in a third conductive layer on the second conductive layer and the plurality of sub-electrodes.

11. The fingerprint detection device of claim 10, wherein at least one of the lowermost electrode and the plurality of sub-electrodes is formed using a metal insulator metal (MIM) fabrication method.

12. The fingerprint detection device of claim 11, further comprising a shield electrode disposed under the uppermost conductive layer and connected to a ground potential.

13. An operating method of a fingerprint detection device including a plurality of fingerprint sensing elements, the method comprising:
    selecting a specific fingerprint sensing element as a target of a fingerprint detection operation;
    determining a gain of a gain controller which changes a gain of an amplifier whose first input terminal is connected to a sensing electrode of the specific fingerprint sensing element;
    resetting the gain controller connected between the input terminal and an output terminal of the amplifier;
    when the reset is completed, switching a bias signal supplied to a second input terminal of the amplifier from a high level to a low level; and while the bias signal is maintained at the low level, connecting the amplifier to an external device so that an output signal of the amplifier is output.

14. The operating method of claim 13, further comprising, after the selecting of the specific fingerprint sensing element:
supplying the bias potential to a sensing electrode of at least one fingerprint sensing element other than the specific fingerprint sensing element.

15. The operating method of claim 14, wherein the supplying of the bias potential comprises supplying the bias signal to a guard ring formed to surround the sensing electrode of the at least one fingerprint sensing element.

16. The operating method of claim 13, wherein the determining of the gain comprises selectively connecting, to the output terminal of the amplifier, a plurality of feedback capacitances having ends connected to the first input terminal of the amplifier.

17. The operating method of claim 13, wherein the determining of the gain comprises adjusting a difference value between the high level and the low level of the bias signal.

* * * * *